United States Patent [19]

Suzuki

[11] Patent Number: 4,600,288
[45] Date of Patent: Jul. 15, 1986

[54] CAMERA PROVIDED WITH A DEVICE FOR GENERATING A SIGNAL REPRESENTATIVE OF THE FINISHED STATE OF THE EXPOSURE

[75] Inventor: Ryoichi Suzuki, Kanagawa, Japan

[73] Assignee: Canon Kabushiki Kaisha, Tokyo, Japan

[21] Appl. No.: 279,222

[22] Filed: Jun. 30, 1981

[30] Foreign Application Priority Data

Jul. 2, 1980 [JP] Japan .................................. 55-90874

[51] Int. Cl.$^4$ ....................... G03B 7/087; G03B 7/099
[52] U.S. Cl. .................................... 354/435; 354/483
[58] Field of Search .................................... 354/29–31, 354/36, 38, 42, 49, 50, 51, 59, 256, 258, 27, 53, 60 E, 60 L, 173, 226, 229, 230, 435, 483

[56] References Cited

U.S. PATENT DOCUMENTS 3,950,766  4/1976  Erlichman et al. ................... 354/29
4,009,866  3/1977  Iwata et al. ........................... 354/29
4,258,990  3/1981  Arisaka et al. ................... 354/59 X Primary Examiner—William B. Perkey
Attorney, Agent, or Firm—Toren, McGeady, Stanger, Goldberg & Kiel

[57] ABSTRACT

In an electromagnetically driven diaphragm shutter having the shutter blade serving at the same time as the diaphragm, uses a quasi-TTL actual aperture light measuring system for measuring the incident light by providing the light measuring element at the auxiliary opening (auxiliary aperture) whose opening amount varies in proportion to that of the principal opening. The auxiliary opening is variable with the opening of the shutter blades. Structure is provided for generating a signal representative of the finished state of an exposure which is adapted to detect the output variation of the light measuring element at the auxiliary aperture when the shutter is closed and then to supply the signal to enable subsequent action such as start of motorized film winding.

2 Claims, 5 Drawing Figures

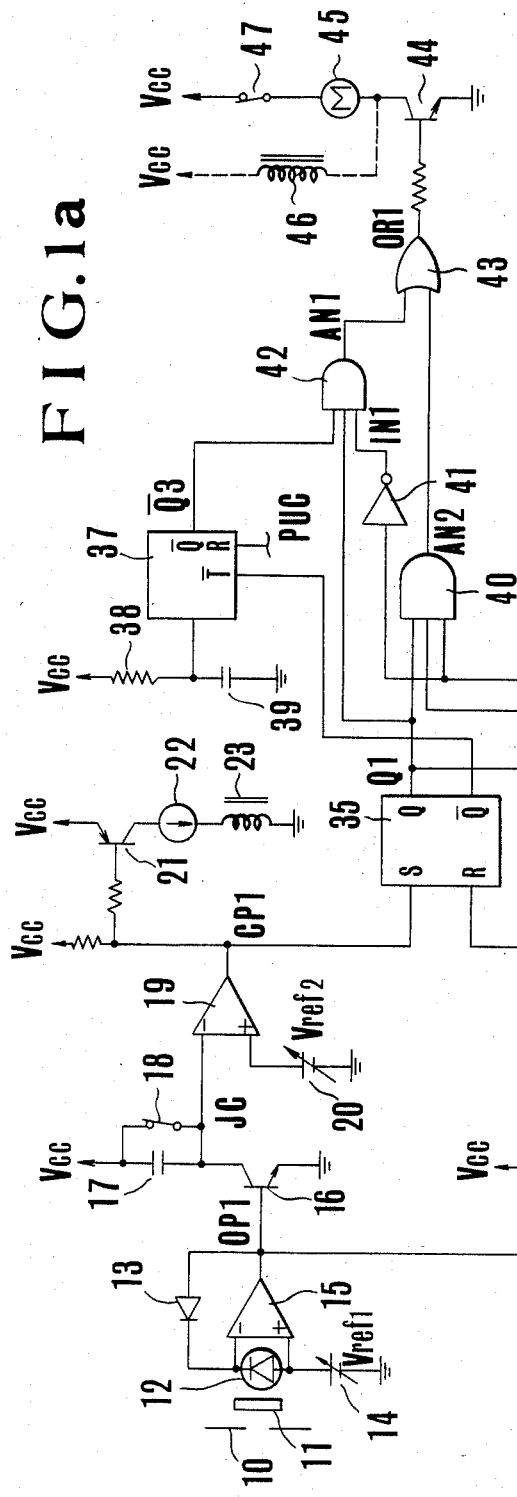
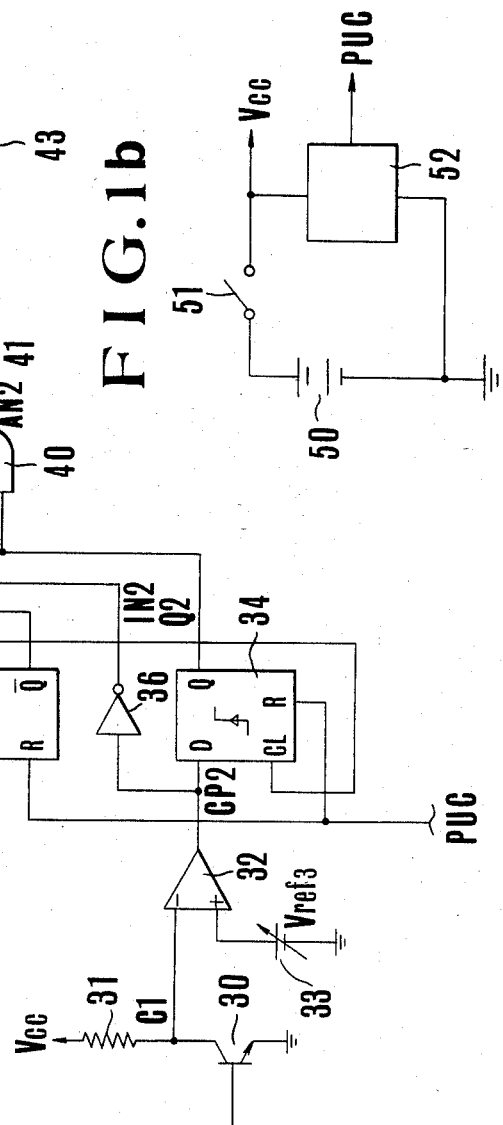
FIG.1a
FIG.1b

CAMERA PROVIDED WITH A DEVICE FOR GENERATING A SIGNAL REPRESENTATIVE OF THE FINISHED STATE OF THE EXPOSURE

BACKGROUND OF THE INVENTION

1. Field of the Invention

The present invention refers to a shutter action finish signal generating device, particularly for a camera designed that the shutter is opened and closed by the to and fro motion or the shutter blade driving member.

2. Description of the Prior Art

Generally, it is necessary to transfer the finish signal of the shutter opening and closing action to the camera side by some means. The reason is that it is necessary to start the current supply to the camera winding motor, to initiate automatic film winding after the shutter opening and closing action, to automatically wind the film, or if necessary, to unlock the winding safety device so as to enable manual winding. Further, the shutter action finish signal, namely, the shutter close signal, is also used at the same time to unlock the press permit mechanism of the release button so as to make the release operation possible again.

In the case of the conventional shutter device so designed that the shutter is opened and closed by rotating the shutter driving member along one direction by means of a tensioned spring, such a shutter close signal can easily be obtained. However, in the case of the shutter device so designed that the shutter is opened and closed by means of the to and fro motion of the shutter blade or the shutter driving member, the shutter blade or its driving member assumes the same phase before the shutter opening and after the shutter closing. In other words, the position of the shutter blade is the same before its opening and after its closing, so that it is difficult to provide a shutter close signal.

Particularly in case of the electromagnetically driven shutter so designed that the shutter blade is electromagnetically moved to and fro, a sufficiently large electromagnetic force for driving the shutter blade cannot be obtained due to various restrictions, so that it is impossible to form the shutter close signal by means of the shutter blade or its driving member and, therefore, it is difficult, in practice, to construct a camera with such a shutter device.

SUMMARY OF THE INVENTION

It is, accordingly, an object of the present invention to provide an improved camera provided with a device for generating a signal representative of the finished state of the exposure which obviates the disadvantages of prior art cameras.

It is another object of the present invention to provide a camera provided with a device for generating a signal representative of the finished state of the exposure, wherein in the shutter device the to and fro motion of the shutter blade is obtained with a driving member. A shutter of the auxiliary aperture light measuring system acts at the same time as aperture is provided. The fact that the auxiliary aperture is brought out of the opened state into the closed state is detected by the change of the brightness with a lignt measuring element arranged behind the auxiliary aperture and the shutter action finish signal is produced by means of a detection signal in such a manner that a sure and high precision shutter action finish signal can be obtained without affecting the to and fro motion of the shutter blade.

It is yet another object of the present invention to provide a camera provided with a device for generating a signal representative of the finished state of the exposure, wherein the mechanism of the camera and that of the shutter device can be simplified by obtaining the shutter action finish signal electrically.

These and further objects and features of the present invention will become apparent from the following detailed description of embodiments thereof taken in conjunction with the accompanying drawings.

BRIEF DESCRIPTION OF THE DRAWINGS

In the drawing:

FIGS. 1a and 1b schematic diagrams of an embodiment of the present invention;

DESCRIPTION OF THE PREFERRED EMBODIMENT

Figure 4:
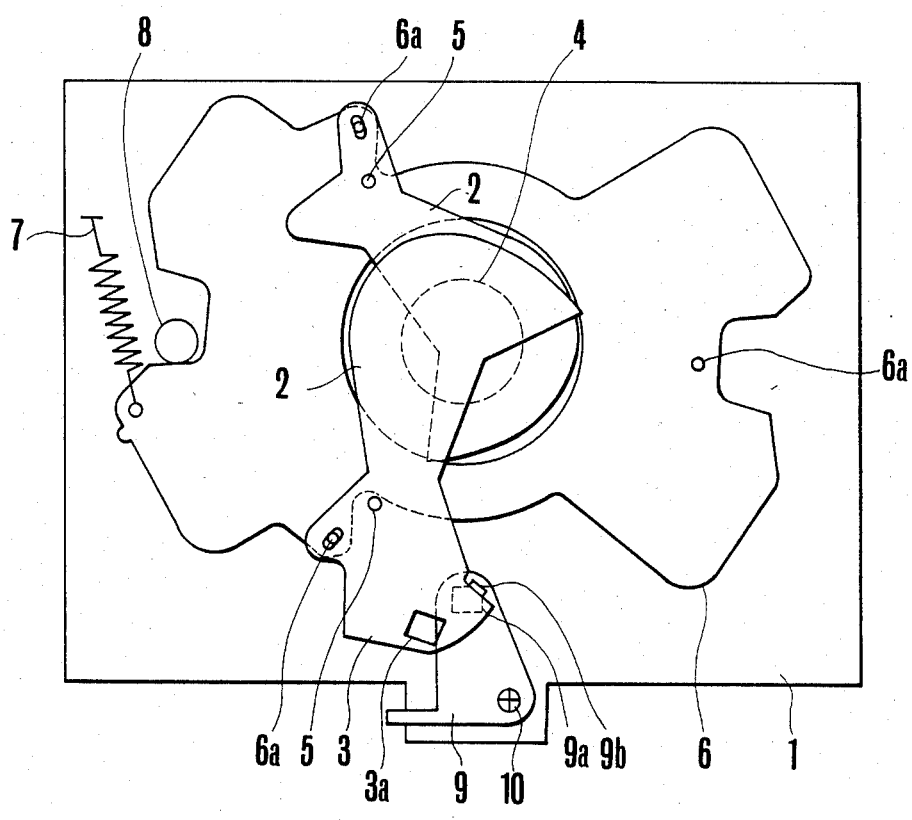
FIG. 4 is an elevational view of an example of the electromagnetically driven shutter applicable to the camera of the present invention.

FIG. 4 shows an embodiment of the electromagnetically driven shutter applicable to the camera of the present invention. In the drawing, 1 is the shutter base plate, while 2 is the shutter blade which acts at the same time as the diaphragm blade 3. The shutter blade 2 consists of three blade elements so as to close the principal opening 4. The auxiliary diaphragm blade 3 is formed at a part of the shutter blade 2. The holes 5 disposed in the shutter base plate 1, act as the centers of rotation of the shutter blade elements. A sector ring 6, on whose surface a coil (not shown in the drawing) is provided in such a manner that by means of the driving force, due to the magnetic force produced when a current is supplied to the coil, the sector ring 6 is rotated counterclockwise to tension the closing spring 7. A stop 8 limits rotation of the sector ring 6, responsive to the spring in the clockwise direction. The stop 8 also limits rotation of the sector ring 7 in the clockwise direction. The limitations or rotational movement of the sector ring result from interference with a notched recess in the sector ring 6. On the sector ring 6, three projections 6a are provided to drive the shutter blade 2. An auxiliary diaphragm 9 is mounted for rotation on the shutter base plate 1 by means of the shaft 10. The auxiliary diaphragm 9 includes an auxiliary diaphragm opening 9a. The drawing shows the relative position of the elements prior to shutter release illustrated in FIG. 4. In the illustrated positions, a low brightness alarm window 9b is formed between the opening 9a and the edge of the auxiliary diaphragm blade 3 to detect the object brightness. This construction is desirable to provide a low brightness alarm before shutter release. The auxiliary diaphragm blade 3 also presents the opening 3a to determine the auxiliary aperture area to be operatively engaged with the principal opening 4. A light sensing element (not shown) is provided behind the opening 9a of the auxiliary aperture 9 for the measurement of light.

The operation will now be explained in detail.

When a current is supplied to the coil (not shown) on the sector ring 6, the sector ring 6 is rotated in a counterclockwise direction, whereby the shutter blade 2 is rotated in the counterclockwise direction. Thus, the windows 9a and 9b of the auxiliary aperture 9 are closed by means of the auxiliary diaphragm blade 3. Upon further rotation of the sector ring 6, the light sensing element (not shown) behind the opening 9 starts to measure the light coming through the auxiliary opening formed between the auxiliary aperture opening 9a and the opening 3a. Soon after, the principal opening 4 also starts to open to start the exposure until a certain light amount measured at the light sensing element is incident. Upon attaining the certain light amount, the current supply to the coil is interrupted in accordance with the procedure to be explained in accordance with the circuit shown in FIG. 1. As a result, the sector ring 6 is rotated by means of the spring 7 in the clockwise direction to close the principal opening 4.

FIG. 1 shows the circuit of an embodiment of the present invention applied to a shutter device acting at the same time as the diaphragm device (an electromagnetically driven shutter as mentioned above) of the auxiliary aperture light measuring system. This apparatus is designed so that the amount of the light coming through the auxiliary opening, whose optical axis does not align with that of the principal opening facing to the film plane and which is opened and closed with the shutter blade, is measured so as to control the closing time of the shutter. Because this shutter construction has a quasi-TTL light measuring system instead of an external light measuring system, -conversion is not necessary, so that a high precision exposure control can advantageously be obtained.

In the drawing, 10 is the auxiliary aperture, 11 is the ND filter for inputting the film ASA sensitivity information, 12 is the photoelectromotive element (SPC), and 15 is an operational amplifier, whose input consists of a MOS type FET. The amplifier 15, also referred to as the SPC head amplifier, has input terminals between which SPC 12 is connected, while in a feedback circuit a logarithmically compressing diode 13 is connected. 14 is the standard voltage source for supplying the positive input terminal of the operational amplifier 15 with the bias voltage $Vref_1$. 16 is the prolongation transistor connected to the output OP1 of the operational amplifier 15, 17 is the time constant condenser connected to the collector and 18 is the count start switch connected in parallel to the condenser 17, so designed as to be brought into the open position in synchronization with the start of the shutter opening operation. Further, to the collector of the prolongation transistor 16, the negative input terminal of the comparator 19 is connected. To the positive input terminal of the comparator 19, a standard voltage source 20 is connected so as to supply the comparator 19 with the standard voltage as bias voltage of $Vref_2$. 21 is a PNP transistor to whose input the output CP1 of the comparator is connected and 22 is a constant current circuit connected to the collector. 23 is the coil of the electromagnetic driving means connected to the output terminal of the constant current circuit 22 so as to drive the blade of the shutter device shown in FIG. 4. When a current is supplied to the coil 23, the electromagnetic driving means opens the shutter blade against the bias of the spring. When the current supply to the coil is interrupted, the shutter blade is closed by means of the spring 7.

30 is a delay transistor connected to the output terminal of the operational amplifier 15, 31 is a resistance connected to the collector and 32 is a comparator, whose negative input terminal is connected to the collector of the transistor 30 so as to receive the output C1. Further, to the positive input terminal of the comparator 32, a standard voltage source 33 is connected for producing the bias voltage of $Vref_3$. 34 is the D-flip flop circuit (hereinafter called D-FF), whose P input is connected to the output of the comparator 32, so as to receive the output CP2. 36 is an inverting circuit connected to the output CP2 of the comparator 32, and 35 is the RS-flip flop (hereinafter called RS-FF), where set input S is connected to the output CP1 of the comparator 19. 40 is a three input AND gate, whose input terminals are respectively connected to the Q output of Q1 of RS-FF 35, the output IN2 of the inverting circuit 36 and the Q output Q2 of D-FF 34. 41 is an inverting circuit connected to the Q output Q2 of D-FF 34.

37 is a timer circuit to be used in the case where the shutter is released at a low brightness and its input T is connected to the Q output of the RS-FF 35 in such a manner that by means of its trigger signal and the level of the Q output Q3 is kept L (low), during the time corresponding to the time constant determined with the resistance 38 and the condenser 39. 42 is the three input AND gate, whose input terminals are respectively connected to the Q output Q3 of the timer circuit 37, the Q output Q1 of RS-FF 35 and the output IN1 of the inverting circuit 41. 43 is a two input OR gate, whose inputs are connected to the output AN1 of the AND gate 42 and the output AN2 of the AND gate 40. When the output OR1 of the OR gate assumes the H level, the shutter action finish signal is produced. 44 is the npn switching transistor, whose base is connected to the output of the OR gate OR1 through a resistance and to whose collector the winding motor 45 is connected. In some embodiments of the invention, the magnet 46 for releasing the operation permit mechanism associated with the release button, can also be connected to the collector of the transistor 44. 47 is the winding finish switch connected in series to the motor 45, so designed as to be brought into the open contact state after every winding of one picture frame of film.

Further, 50 is a power source battery, 51 is a main switch and 52 is a circuit for producing the power up clear PUC signal when the main switch 51 is closed, whereby the outputs are connected to the reset terminals of the timer circuit 37, the RS-FF 35 and the D-FF 34.

The operation of the present embodiment will be described for the situation when the object brightness is sufficiently high that it is possible for the auxiliary aperture light sensing element 12 to detect the closing operation of the auxiliary aperture 10 and when the object brightness is so low that it is impossible for the auxiliary light sensing element 12 to detect the closing operation of the auxiliary aperture 10.

Considering first, the situation, when it is possible to detect the closing operation of the auxiliary aperture, will be explained by reference to the timing chart shown in FIG. 2.

When the main switch 51 closes, the power up clear circuit 52 produces a one pulse signal PUC, so as to reset the D-FF 34, RS-FF 35 and the timer circuit 37, whose outputs Q2, Q1 and $\overline{Q}3$, respectively, assume the L level, L level and H level.

Because, before the shutter release, the auxiliary aperture 10 is in the pre-opened state, as mentioned above, in order to sense the light for the low brightness alarm, the level of the output OP1 of the operational amplifier 15 is raised by the logarithmically compressed amount of the incident light upon SPC 12 in such a manner that the collector voltage C1 of the delay transistor 30 assumes the L (low) level. When the shutter is released in this state, the shutter blade 2, as is shown in FIG. 4, is being opened, while during this opening operation, the auxiliary aperture 10 is closed once. At this time, the level of the collector voltage C1 of the delay transistor 30 goes H (high), the level of the output CP2 of the comparator 32 goes L, and that of the output IN2 of the inverting circuit 36 goes H. However, because at the time when the auxiliary aperture 10 is once closed out of the pre-opened state, RS-FF 35 has not yet been set and the level of its Q output Q1 remains L, the level of the outputs AN1 and AN2 of the AND gates 40 and 42 remain L, while the level of the output OR1 of the OR gate 43 remains L, so that the shutter action finish signal is not produced.

Thus, together with the opening of the principal opening, the auxiliary aperture 10 is opened again by means of the opening operation of the shutter blade in such a manner that the light is again incident upon SPC 12.

Figure 2:
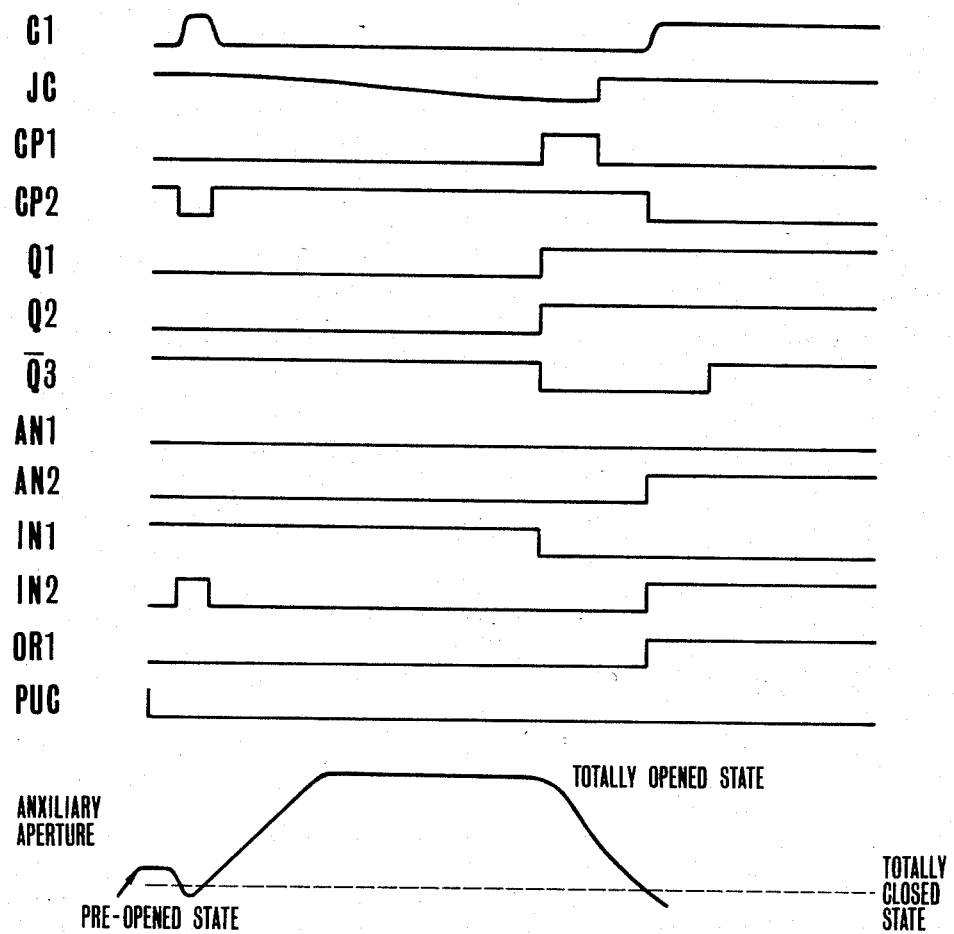
FIG. 2 is a diagrammatic timing chart illustrating relationships when the object brightness is high.

On the other hand, when the shutter blade opening action is started with the shutter release, the count start switch 18 is opened, so that at this time the time constant condenser 17 starts to be charged with the prolonged collector current of the delay transistor 16, whereby the collector voltage JC goes down as is shown in FIG. 2. While, the collector voltage JC is higher than the positive input level $V_{ref_2}$ of the comparator 19, the level of the output CP1 of the comparator 19 is L, so that the pnp transistor 21 is in the switched-on state. Because in this way, a certain current (holding current), determined by the constant current circuit 22, runs through the coil 23 of the electromagnetically driven shutter, the shutter blade opening action is maintained. When during the shutter blade opening action the collector voltage JC of the delay transistor 16 becomes lower than the positive input level $V_{ref_2}$ of the comparator 19 so as to finish the exposure, the level of the output CP1 of the comparator 19 goes H (shutter close order signal) and the pnp transistor 21 assumes the switched-off state, with the result that the current supply to the coil 22 of the electromagnetically driven shutter is interrupted, whereby the shutter blade 2 starts to move in the closing direction responsive to the bias of the spring 7. Further, with the change in level of the output CP1 of the comparator 19 into H RS-FF 35 is set, whereby the level of the Q output Q1 goes H.

In the case described above, the auxiliary aperture 10 is not closed with the shutter blade, the collector voltage C1 of the delay transistor 30 assumes the L level so that the output CP2 of the comparator 32 assumes the H level and, therefore, when the level of the Q output Q1 of RS-FF 35 goes H, the level of the Q output Q2 of D-FF 34 also goes H and the output IN2 of the inverting circuit 36 assumes the L level. Further, by means of the $\overline{Q}$ output of RS-FF 35, the timer circuit 37 is triggered, whereby the level of the $\overline{Q}$ output $\overline{Q3}$ is maintained at L for a certain period determined by the resistance 38 and the condenser 39 for the time constant circuit.

On the other hand, when as mentioned above, the shutter blade starts the closing action and the principal opening and the auxiliary aperture are totally closed, the output of the operational amplifier 15 goes down, so that the level of the collector voltage C1 of the delay transistor 30 becomes H, that of the output CP2 of the comparator 32 becomes L and that of the output IN2 of the inverting circuit 36 becomes H. Because at this time, the level of the other two inputs (Q1, Q2) of the AND gate 40 remain H, as soon as the level of the output IN2 of the inverting circuit 36 goes H, that of the output AN2 of the AND gate 40 goes H, whereby the output OR1 of the OR gate 43 assumes the H level so as to produce the shutter action finish signal. When the object brightness is high, in this way, the change of the brightness is detected with the auxiliary aperture light sensing element 12 is detected so as to produce the shutter action finish signal.

Figure 3:
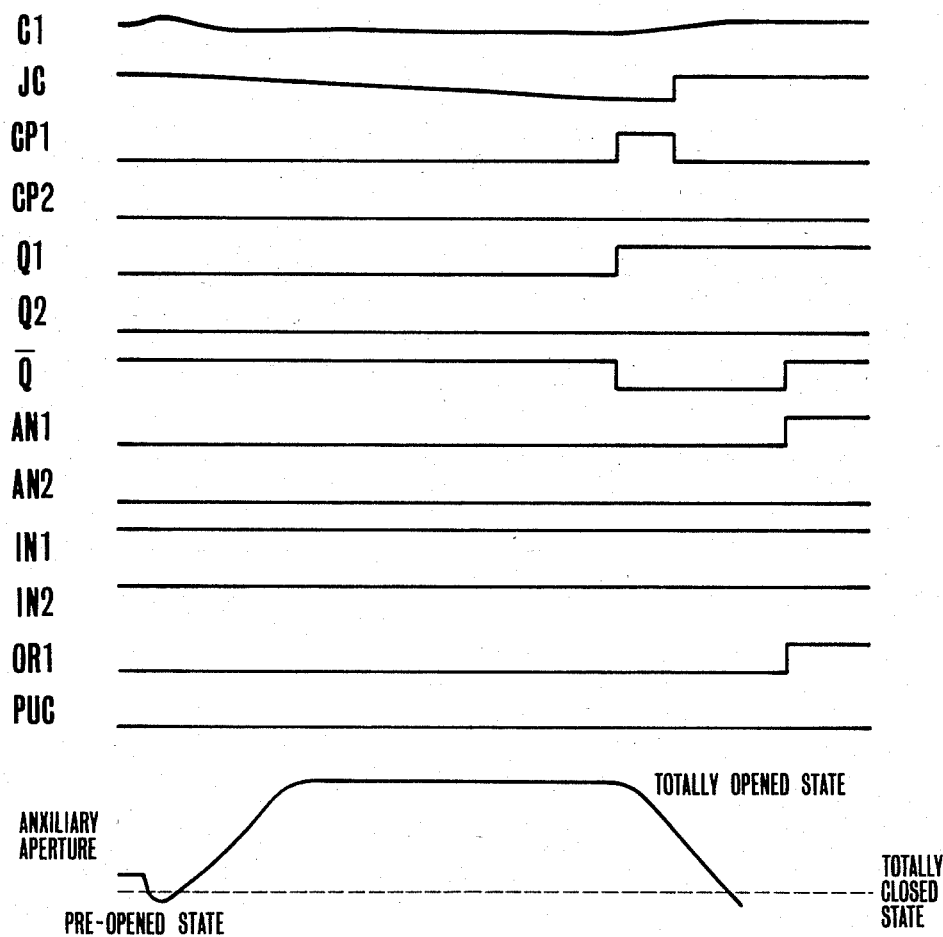
FIG. 3 is a diagrammatic timing chart illustrating relationships when the object brightness is low.

The case will next be considered where it is impossible to detect the closing operation of the auxiliary aperture by referring to the timing chart shown in FIG. 3.

Because, in this case, the incident light amount upon the auxiliary aperture light measuring element 12 is not sufficient, even if the shutter assumes the totally opened state, the output voltage of the operational amplifier 15 does not go up so high, whereby the collector voltage C1 of the delay transistor 30 assumes a value which is a little lower than the Vcc level. Consequently, the level of the output CP2 of the comparator 32 remains L. Because the level of the D input is L, that of the output Q2 of D-FF 34 is maintained L, even if the timing up of the time constant condenser 17 for determining the shutter time (exposure time) is finished in such a manner that the level of the output CP1 of the comparator 19 goes H, the RS-FF 35 in the next step set and the level of its Q output Q1 is H. Because, in this case, the level of the output of the AND gate 40 is maintained at L even if the shutter is closed, the shutter action finish signal is not produced through the AND gate 40 and the OR gate 43.

However, after the lapse of a certain determined time after RS-FF 35 is set with the shutter close order signal by the output CP1 of the comparator, the level of the $\overline{Q}$ output $\overline{Q3}$ goes H, because the timer circuit 37 is triggered with the $\overline{Q}$ output of RS-FF 35.

Further at this time, the level of the output IN1 of the inverting circuit 41 is H because that of the Q output Q2 of D-FF 34 is kept at L, while the level of the output AN1 of the AND gate 42 goes H because that of the output Q1 of RS-FF 35 is H, in such a manner that the level of the output OR1 of the OR gate 43 also goes H so as to produce the shutter action finish signal.

In the case where the object brightness is low, the shutter action finish signal is produced after the lapse of a certain predetermined time after the shutter close order signal is produced by means of the timer circuit. It goes without saying that the predetermined time should be set longer than the interval between the time when the shutter closing action starts and the time when the shutter is totally closed.

As already explained in detail, in accordance with the present invention, the shutter action finish signal is produced by detecting the closure of the auxiliary aperture with the change of the brightness, so that a sure and precise shutter action finish signal, whereby the to and fro motion of the shutter blade 2 can be obtained without unreasonable force requirements. Further, a surer signal can be obtained by means of the method where the shutter action finish signal is produced in advance after the lapse of a predetermined time after the shutter close order signal is produced. The next sequence can be carried out more quickly than would ordinarily be possible.

Further, in accordance with the present invention, the shutter action finish signal is produced with the AND gate output signal produced from the latch signal of the shutter close order signal and the shutter close signal from the light measuring element of the auxiliary aperture. Accordingly, any erroneous shutter action finish signal is produced when the auxiliary aperture is once brought into the closed state, from the pre-opened state, before the shutter opening action can be avoided.

Further, it can easily be understood that the same effect can be obtained when the present invention is applied to a camera designed so that the shutter is opened and closed by driving the shutter driving member with one conventional tensioned spring.

Further, although in the present embodiment, the light sensing element for detecting the shutter action finish signal is also used for detecting the exposure, it is possible to provide a separate light sensing element for exposure detection.

What is claimed is:

1. A camera comprising:
   a shutter having blades functioning as aperture setting blades, and disposed in the photographic optical path of the camera;
   an auxiliary diaphragm being operatively engaged with the movement of said aperture setting blades;
   a light measuring circuit having a light measuring element disposed at said auxiliary diaphragm so as to measure a light from an object to be photographed through the auxiliary diaphragm;
   said auxiliary diaphragm being in an open state for performing a pre-measurement of the light from the object before a shutter release, and becoming a closed state immediately after the start of shutter action and becoming an open state in accordance with a shutter opening for performing an exposure measurement and being closed in accordance with a shutter closing, said light measuring circuit measuring the light from the object through said auxiliary diaphragm for an exposure when the shutter is opened;
   means for generating a shutter-close order signal for closing said shutter in response to an output of said light measuring circuit; and
   a detector circuit for detecting an output variation of said light measuring circuit caused by closing of said auxiliary diaphragm after said shutter-close order signal is generated and for generating a signal representative of the finished state of the exposure.

2. A camera according to claim 1, further comprising a timer circuit being operated by the start of shutter action and generating said shutter-close order signal after a lapse of a certain predetermined time when no shutter-close order signal is given from the shutter-close order signal generating means.

* * * * *